Patented July 4, 1933

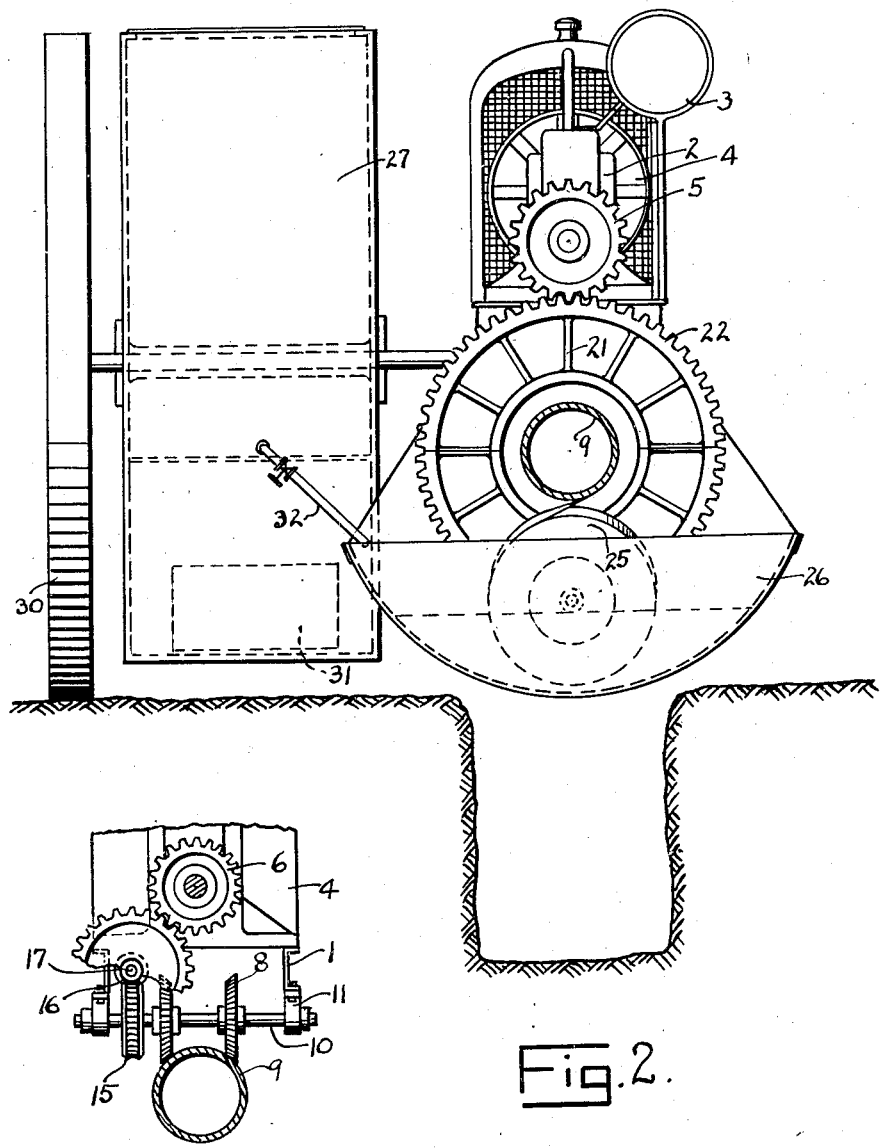

1,917,197

UNITED STATES PATENT OFFICE

EUGENE LEONARD ROLFS, OF ST. LOUIS, MISSOURI, ASSIGNOR TO JOHNS-MANVILLE CORPORATION, OF NEW YORK, N. Y., A CORPORATION OF NEW YORK

PIPE WRAPPING MACHINE

Application filed April 29, 1931. Serial No. 533,843.

My invention relates to a machine for wrapping a strip of protective material about a pipe and is particularly adapted for use on large sized pipe such as is used in pipe lines for carrying gas, petroleum, water and the like.

It has become customary to protect the said pipes against corrosion in use by placing protective coatings and wrapping thereon before the pipe is laid in position in the earth.

It is an object of my invention to provide a mechanical device adapted to be supported largely upon the pipe which is wrapped for wrapping a strip of protective material about the pipe.

It is an object to provide a device which is rotatable about the pipe, carrying with it a roll of covering material which may be thus wound in a spiral direction about the pipe.

I contemplate the provision of means for covering the wrapping material with an adhesive substance acting also as a coating material for the pipe.

In the drawings herewith, Fig. 1 is a side elevation of a device embodying my invention, certain parts being broken away for greater clearness.

Fig. 2 is a front elevation of the device shown in Fig. 1.

Fig. 3 is a broken detail illustrating the driving means whereby the wrapping device is moved longitudinally of the pipe.

Figure 1:
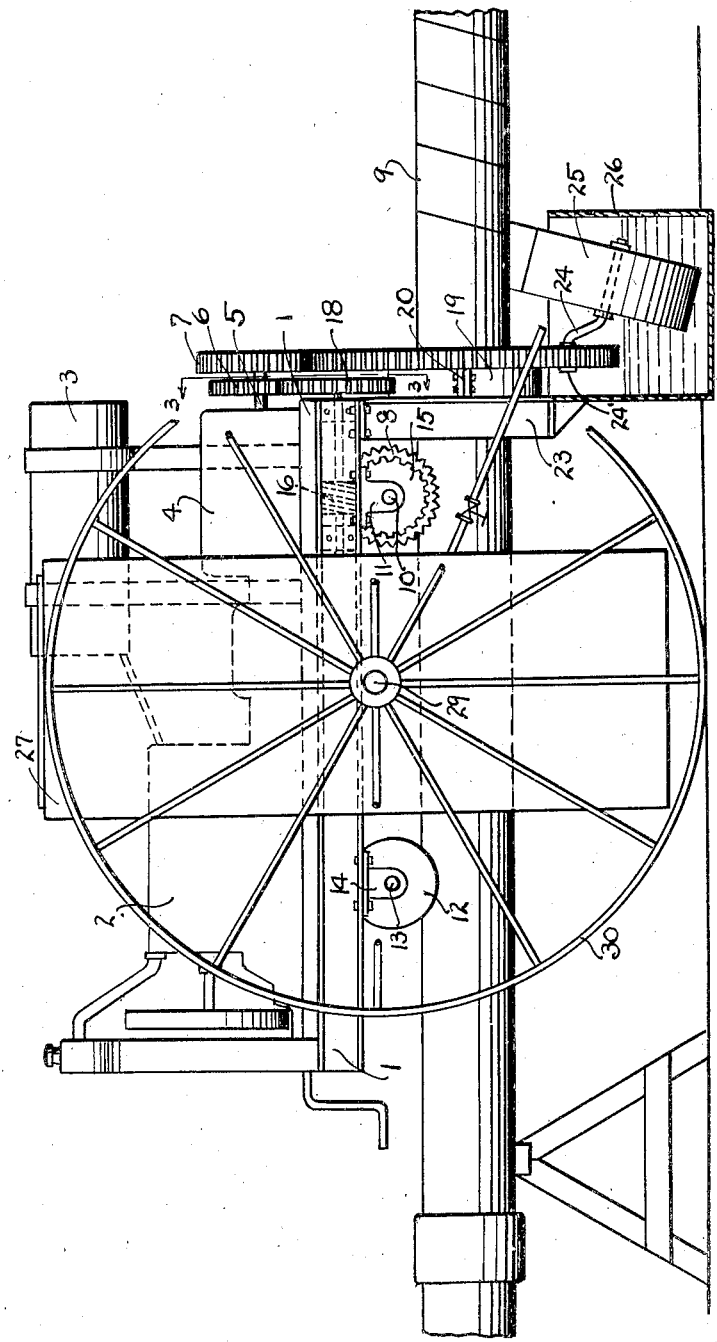

I desire to mount the body of the machine upon the pipe which is to be wrapped and in the drawing I have shown a frame 1, upon which is mounted a motor or driving device indicated somewhat diagrammatically at 2. This is preferably an internal combustion engine of ordinary construction adapted to receive fuel from a small tank 3 adjacent thereto.

Adjacent to said motor I provide a gear case or transmission housed within a covering 4. The transmission is adapted to operate a shaft 5, upon which are mounted driving gears 6 and 7.

The frame is supported upon the pipe by means of a pair of rearward rollers 8, toothed on their outer peripheries and beveled to engage against the outer surface of the pipe 9, as shown in Fig. 3. These gears are mounted upon the shaft 10, supported within bearings 11 secured to the frame member 1 previously referred to.

The forward end of the device is supported upon wheels 12 mounted upon a shaft 13 supported in brackets or bearings 14 secured to the frame as in the case of the driving wheels.

The said driving wheels 8 are caused to move along the pipe through the rotation of the shaft 10 by means of the worm gear 15 secured to said shaft and engaging with a worm gear 16 mounted upon the shaft 17 supported for rotation in the frame. The shaft 17 has at its rearward end a gear 18, which operatively engages with the driving gear 6 on the shaft of the transmission. In this way the rotation of the shaft 5 will communicate a rotating movement to the driving wheels 8 whereby the machine will be propelled longitudinally of the pipe during the wrapping operation.

Mounted at the rearward end of the frame 1 is a drum 19, which is made in two sections adapted to be secured together at their margins as shown at 20 in Fig. 1. The drum is spaced outwardly from the pipe 9 and is adapted to rotate about the pipe as an axis. At the rearward end of the drum is a spider 21 on the outer circumference of which is a gear 22 adapted to operatively engage a gear 7 previously mentioned. Said drum is positioned within a stationary ring 23 on the frame within which it may rotate in an obvious manner.

On one side of the drum and adjacent the outer margin thereof is an arm or shaft 24. Said arm is inclined outwardly and supports thereon a roll 25 of wrapping material, the said roll being rotatable upon the shaft 24 as an axis. As will be seen from Fig. 1, the downward or outward inclination of the shaft 24 allows the roll of wrapping material to dip within a tank or container 26 for coating material such as some asphaltic compound or the like. The inclination of the roll also places it at a proper angle relative to the pipe so that it is wound in a spiral direction about the pipe with the proper degree of overlapping of each winding relative to the next preceding one. It will be understood that when the drum is rotated the roll is carried about the pipe and dips within the coating material once at each revolution of the drum, this being sufficient to thoroughly cover the strip of material on the side thereof which contacts with the pipe.

The coating material is supplied to the container 26 from a tank 27 placed adjacent to the frame 1 and supported upon a shaft or axle 29, supported at one end upon the frame 1 and at the other end upon a wheel 30. Said wheel is adapted to bear upon the adjacent ground and act as a balance to support the frame 1 evenly upon the pipe and also to support the tank 27 for the coated material. It is to be understood that the tank 27 has a furnace or heating device indicated at 31 below the same and has a discharge pipe 32 leading from the tank downwardly to the container 26. In this manner a new supply of coating material may be supplied to the container whenever necessary.

In the operation of this device it will be mounted adjacent the pipe to be wrapped and supported largely upon the pipe itself. When the motor is operated the traction wheels 8 bearing upon the pipe will act to propel the machine along the pipe at the desired rate. As the machine progresses along the pipe the rotation of the drum 19 will carry the roll of wrapping material 25 about the pipe, applying the material to the pipe in a smooth and uniform manner and the coating material supplied to the roll of wrapping material will furnish sufficient adhesive to cause the material to stick to the pipe and form a protective covering therefor.

The device is exceedingly simple in construction and may be operated for an economical sum and will make it possible to apply a wrapping to the pipe rapidly and cheaply. I am thus enabled to wrap the felt or other covering uniformly and quickly as will be obvious.

Having thus described my invention, what I claim as new is:

1. In a pipe wrapping machine adapted to travel along a pipe, a drum rotatable about the pipe, a spool of wrapping material on said drum, a tank containing coating material, and means to rotate said drum to move said spool through said tank and in a planetary path about said pipe, whereby coating material is applied to said wrapping material and the coated wrapping material is wrapped upon said pipe.

2. A pipe wrapping machine comprising a frame, traction wheels mounted thereon adapted to engage a pipe, a drum on said frame rotatable about said pipe, a spool of wrapping material carried by said drum, a tank containing coating material, means for driving said traction wheels, and means for rotating said drum to move said spool through said tank and in a planetary path about said pipe, whereby coating material is applied to said wrapping material and the coated wrapping material is wrapped upon said pipe.

3. A frame, traction wheels mounted thereon adapted to engage a pipe and support said frame, a drum on said frame rotatable about said pipe as an axis, a spool of wrapping material carried by said drum in a planetary path about said pipe, a tank containing coating material through which said spool is moved in its path about the pipe, and common means for driving said traction wheels and rotating said drum, whereby coating material is applied to said wrapping material and the coated wrapping material is wrapped upon said pipe.

4. In a pipe wrapping device comprising a frame, traction wheels mounted thereon adapted to engage a pipe, a drum on said frame rotatable around said pipe, a spool of wrapping material on said drum, a tank containing coating material, means for driving said traction wheels, means for rotating said drum to move said spool through said tank in a planetary path about said pipe, whereby coating material is applied to said wrapping material and the coated wrapping material is wrapped upon said pipe, and means for stabilizing the device on the pipe.

5. A pipe wrapping machine including a main support frame and a sub-frame adapted to surround the pipe, a drum rotatable in said sub-frame, a spool of wrapping material thereon, a tank containing coating material, means to rotate said drum to move said spool through said tank and around said pipe, whereby the coating material is applied to said wrapping material and the coated material is wrapped upon said pipe, and means engaging said pipe to propel said device along said pipe.

6. A machine for wrapping pipe including a frame mounted to travel along a pipe, traction wheels engaging said pipe to propel said frame, a motor on said frame, a drum rotatable around said pipe, a spool of wrapping material carried on the side of said drum, a tank containing coating material, the drum when rotated acting to carry the spool of wrapping material through the tank and in a planetary path around the pipe and operative connections to actuate said wheels and said drum from said motor, whereby the frame is moved along the pipe, the coating material is applied to said wrapping material and the coated wrapping material is wrapped upon said pipe.

7. A pipe wrapping machine comprising a frame, traction wheels mounted thereon adapted to engage a pipe and support said frame, a drum on said frame rotatable around said pipe, a spool of wrapping material replaceably carried by said drum at one side thereon, a tank containing coating material, means for rotating said traction wheels so as to propel said frame along said pipe, and means for rotating said drum about said pipe, so as to cause said spool to move through said tank to coat the wrapping material and wrap the wrapping material so coated around the pipe in an overlapping relation.

8. A pipe wrapping machine comprising a frame, traction wheels mounted thereon adapted to engage a pipe and support said frame, a drum on said frame rotatable about said pipe, a spool of wrapping material carried by said drum, a tank containing coating material, means for causing relative movement between said frame and said pipe, means for rotating said drum about said frame so as to cause said spool to move through said tank to coat the wrapping material and wrap the wrapping material so coated around said pipe, and means for controlling the unwinding of said spool of wrapping material.

9. In a pipe wrapping machine, a support, a frame thereon mounted to rotate about a pipe, means on said frame and movable therewith to feed wrapping material to be wrapped about said pipe, and a container into which said wrapping material is submerged as it is fed to said pipe.

10. A portable combination pipe wrapping and coating machine, wherein the wrapping and coating operations are performed simultaneously, a container for coating material, a support for wrapping material, and means to rotate a web of the wrapping material through a bath of the coating material and about the pipe.

In testimony whereof I hereunto affix my signature this 13th day of April, A. D. 1931.

EUGENE LEONARD ROLFS.